US 6,626,406 B1

(12) United States Patent
Olson, Jr.

(10) Patent No.: US 6,626,406 B1
(45) Date of Patent: Sep. 30, 2003

(54) UTILITY POLE WITH REMOVABLE CROSSARM

(76) Inventor: Ted Olson, Jr., P.O. Box 880, Atkinson, NE (US) 68713

( * ) Notice: Subject to any disclaimer, the term of this patent is extended or adjusted under 35 U.S.C. 154(b) by 199 days.

(21) Appl. No.: 09/678,119

(22) Filed: Oct. 3, 2000

(51) Int. Cl.[7] ............................................. H02G 7/00
(52) U.S. Cl. .......................... 248/219.3; 248/219.2; 403/347
(58) Field of Search ...................... 248/218.4, 219.2, 248/219.3, 158, 159; 403/347, 378; 256/65

(56) References Cited

U.S. PATENT DOCUMENTS

| | | | | |
|---|---|---|---|---|
| 3,454,252 A | * | 7/1969 | Morgan et al. ............... | 248/358 |
| 3,638,814 A | * | 2/1972 | Lowery ....................... | 211/177 |
| 4,327,514 A | | 5/1982 | Bourque ...................... | 40/607 |
| 4,477,059 A | * | 10/1984 | Willis ........................ | 256/65 |
| 4,493,579 A | * | 1/1985 | Rautakoura .................. | 403/237 |
| 4,542,885 A | * | 9/1985 | Rossiter ...................... | 256/69 |
| 4,609,185 A | * | 9/1986 | Prater et al. ................. | 256/65 |
| 4,813,651 A | * | 3/1989 | Rutledge ..................... | 256/65 |
| 4,932,623 A | * | 6/1990 | Reisdorff .................... | 248/219.3 |
| D326,604 S | | 6/1992 | Stubbersfield et al. ........ | D8/373 |
| 5,228,260 A | | 7/1993 | Dziedzic ..................... | 52/697 |
| 5,505,036 A | | 4/1996 | Wiles ......................... | 52/787.1 |
| 5,605,017 A | | 2/1997 | Fingerson et al. ............ | 52/40 |
| 5,880,404 A | * | 3/1999 | Stanley et al. ............... | 174/45 |
| 5,903,991 A | * | 5/1999 | Sasse ......................... | 40/607 |

* cited by examiner

Primary Examiner—Ramon O. Ramirez
Assistant Examiner—Steven Marsh

(57) ABSTRACT

A utility pole with cross-arm connection includes an upright pole with an aperture formed therethrough for receiving a crossarm. A sleeve is journaled through the pole aperture and fastened to the pole, and the crossarm is journaled through the sleeve with opposite ends projecting outwardly from the pole. The crossarm is connected to the sleeve to secure the crossarm in position.

13 Claims, 2 Drawing Sheets

UTILITY POLE WITH REMOVABLE CROSSARM

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to crossarms for utility poles, and more particularly to an improved attachment system for a crossarm to a utility pole.

(2) Background Information

Utility lines are generally supported on utility poles on crossarms connected to the poles. Such crossarms can also support transformers and other related electrical equipment on the pole.

There are various types of crossarms, including tangent crossarms for supporting generally vertical loads, and deadend crossarms for supporting generally horizontal loads. Most utility pole crossarms are currently manufactured of wood, fiberglass, or a composite material. Typically, a crossarm is attached to the side of the utility pole utilizing a three point support, which includes a single bolt through the center of the arm and through the pole, and an A-frame crossbrace extending from distal points on the arm downward to a connection on the pole below the arm. These conventional crossarm connections suffer several problems. First, the use of a single bolt between the center of a crossarm and the pole creates a pivot point about which the crossarm will move during high winds and storms. This type of connection has difficulty in restraining rotational movement of the crossarm about the axis of the center bolt, as well as horizontal "whipping" of the crossarm about the vertical axis of the pole.

In addition, the crossarm mounting is dependent on the sheer strength of a single bolt for the support of utility lines and other structures on the crossarm.

BRIEF SUMMARY OF THE INVENTION

It is therefore a general object of the present invention to provide an improved crossarm connection to a utility pole.

Another object is to provide a crossarm connection for a utility pole which permits simple attachment and replacement of a crossarm, yet is sturdier and more stable than prior art crossarms.

A further object is to provide a crossarm connection for a utility pole which resists rotation of the crossarm about a horizontal axis and also restrains horizontal whipping of the crossarm.

Yet another object of the present invention is to provide a crossarm connection for a utility pole which provides an increased sheer strength of the connection over prior art single bolt type connections.

These and other objects of the present invention will be apparent to those skilled in the art.

The utility pole with cross-arm connection of the present invention includes an upright pole with an aperture formed therethrough for receiving a crossarm. A sleeve is journaled through the pole aperture and fastened to the pole, and the crossarm is journaled through the sleeve with opposite ends projecting outwardly from the pole. The crossarm is connected to the sleeve to secure the crossarm in position.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
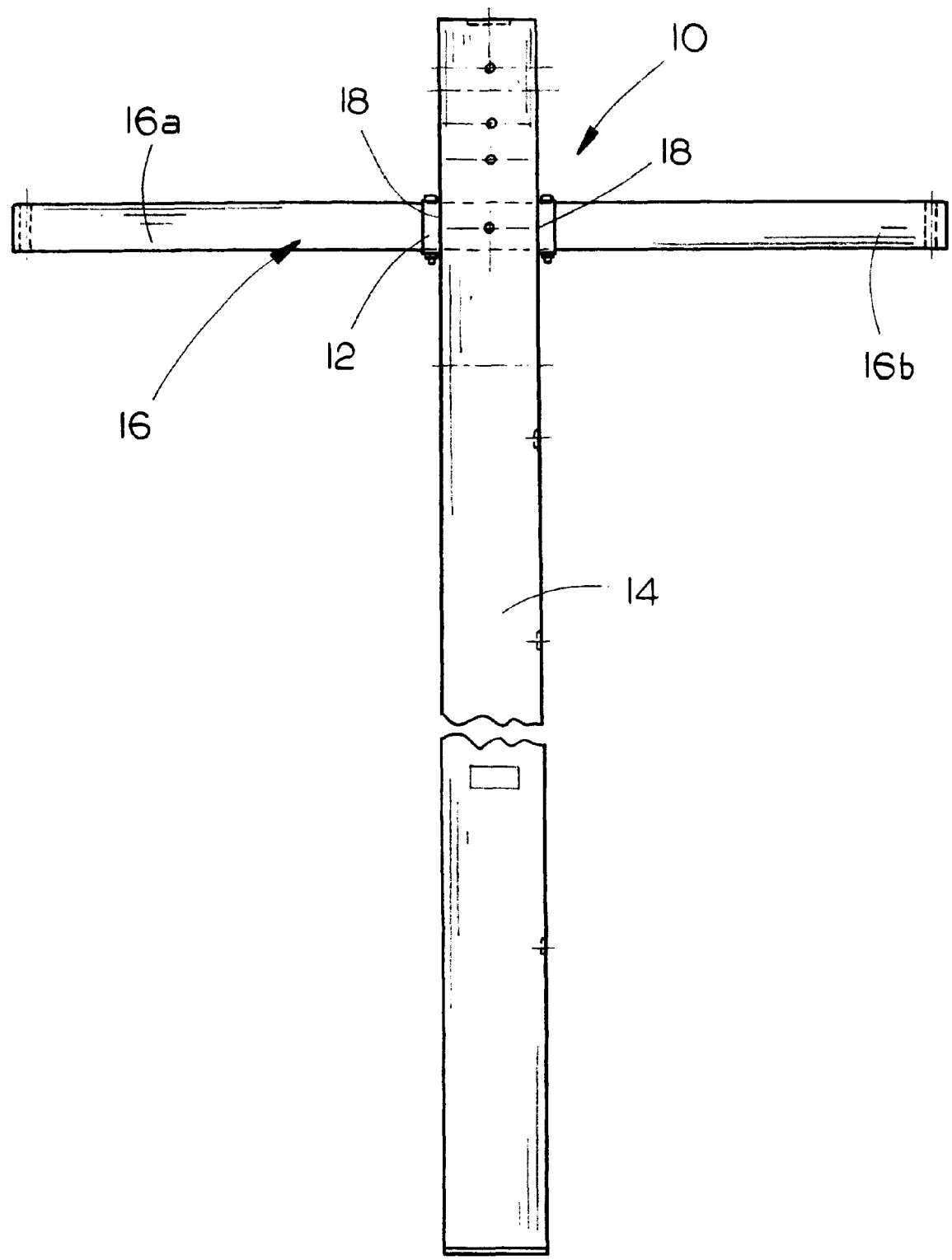
FIG. 1 is a front elevational view of a utility pole with the crossarm and crossarm connection of the present invention.

Referring now to the drawings, and more particularly to FIG. 1, the cross-member connector of the present invention is designated generally at 10, and includes a tubular sleeve 12 mounted through a tubular pole 14 for retaining a tubular cross-arm 16 generally orthogonal to pole 14. Pole 14 is of a conventional tubular steel type formed of 8⅝ inch outer diameter steel pipe with a ⅛ inch thick wall. Preferably, the pole is formed of steel having a 55,000 psi minimum yield strength, and meets ASTM specification A595. Obviously, the pole could also be tapered along its length, and be formed of other materials and in other thicknesses and sizes.

Figure 3:
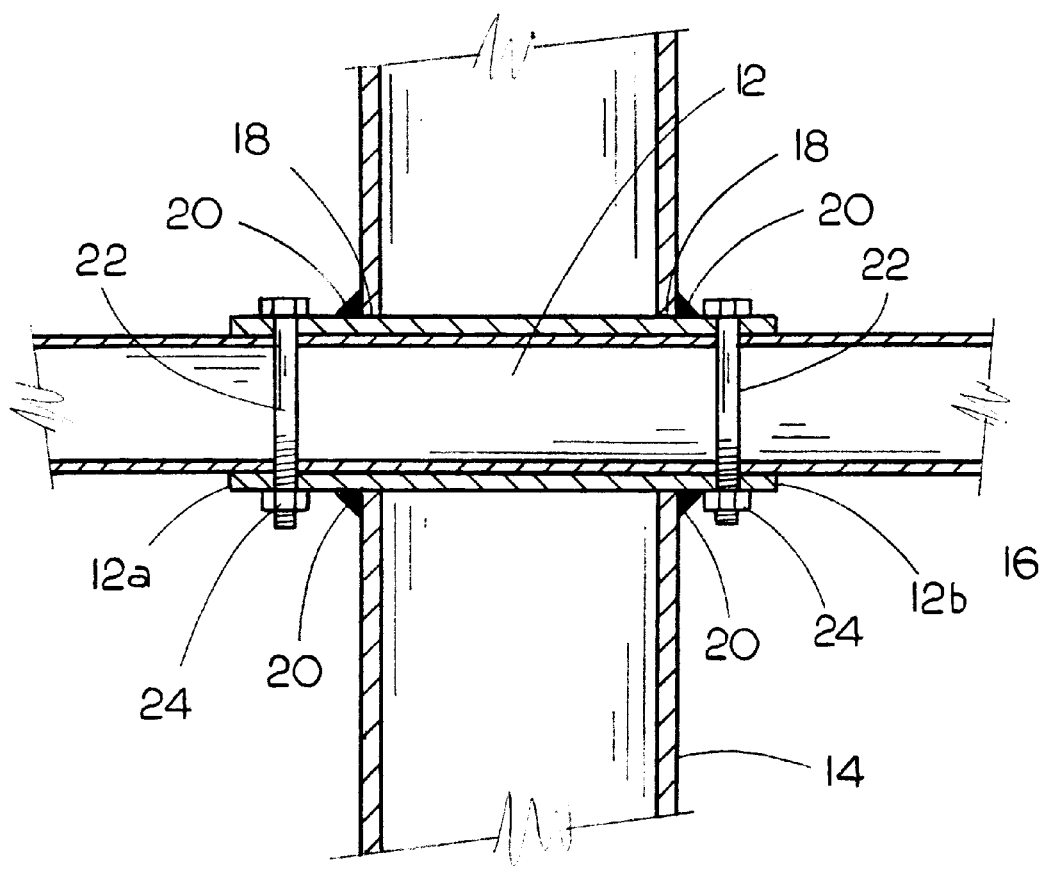
FIG. 3 is an enlarged cross-sectional view taken at lines 3—3 in FIG. 2.

At the desired crossarm location, an aperture 18 is formed through diametric sides of pole 14, as shown in FIG. 3. Apertures 18 are horizontally aligned and congruent in size and shape.

Figure 2:
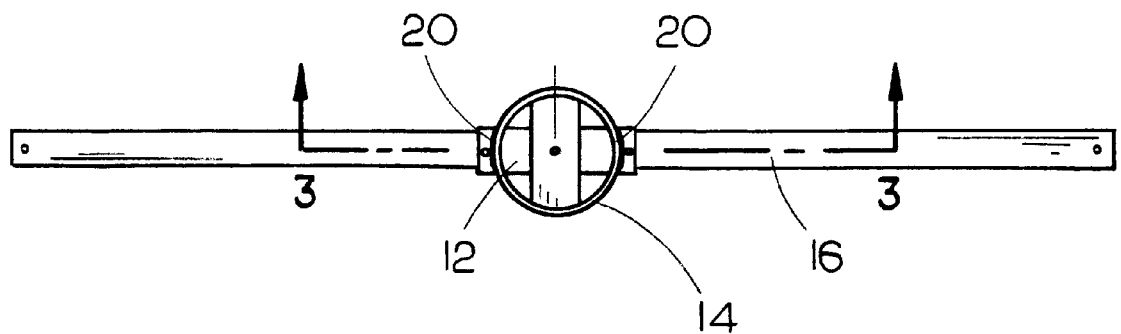
FIG. 2 is a top elevational view of the pole and crossarm of FIG. 1.

Referring now to FIGS. 1–3, sleeve 12 is formed of rectangular tubing with interior width and height slightly greater than the width and height of crossarm 16, thereby permitting slidable insertion of crossarm 16 through sleeve 12. Welds 20 along the joint between sleeve 20 and pole 14 affix sleeve 12 in position with the opposing ends 12a and 12b projecting outwardly from pole 14.

Crossarm 16 is a 3½ inch by 4½ inch rectangular member positioned with the greater dimension oriented vertically. Crossarm 16 is an elongated member and journaled through sleeve 12 such that the crossarm ends 16a and 16b project equal distances from pole 14. A pair of bolts 22 are journaled through aligned apertures in each sleeve end 12a and 12b and through aligned apertures in crossarm 16, to secure crossarm 16 in position in sleeve 12. Locknuts 24 on bolts 22 retain the bolts in position.

Because the crossarm passes through the center of pole 14, it can be seen that there are two spaced apart points of securement of the crossarm with pole 14, on opposite sides of the pole. This greatly increases the strength of connection 10 to resist rotation of crossarm 16 about a horizontal axis, horizontal whipping of the crossarm, as well as the overall sheer strength of the connection. At the same time, the crossarm may be easily removed and replaced, if necessary, by removing bolts 22 and sliding crossarm 16 out of sleeve 12.

Whereas the invention has been shown and described in connection with the preferred embodiment thereof, many modifications, substitutions and additions may be made which are within the intended broad scope of the appended claims.

I claim:

1. In combination:
   an upright utility pole having a vertical axis and a diameter;
   an aperture formed through the pole;
   a tubular sleeve journaled through the aperture and projecting from opposing sides of the pole;
   a crossarm extending through the sleeve and having free opposing ends projecting from opposing sides of the pole; and
   means for removably fastening the crossarm to the sleeve.

2. The combination of claim 1, wherein the aperture and crossarm are oriented generally perpendicularly to the pole vertical axis.

3. The combination of claim 2, wherein the aperture and crossarm pass through a central axis of the pole.

4. The combination of claim 3, wherein the pole is a tubular member and the aperture includes an opening formed in opposing walls of the pole.

5. The combination of claim 4, wherein the sleeve has a cross-sectional shape which is the same as a cross-sectional shape of the crossarm.

6. The combination of claim 5, wherein the crossarm is an elongated tubular member.

7. The combination of claim 6, wherein the crossarm has a rectangular cross-sectional shape with a vertical axis greater than a horizontal axis.

8. The combination of claim 7, wherein the means for removably fastening the crossarm includes a pair of bolts journaled through pairs of diametric apertures in each sleeve projecting end and pairs of diametric apertures formed in the crossarm.

9. The combination of claim 8, wherein said pole and sleeve are metal, and wherein said sleeve is fastened to the pole by welding.

10. The combination of claim 1, wherein the pole is a tubular member and the aperture includes an opening formed in opposing walls of the pole.

11. The combination of claim 10, wherein the sleeve has a cross-sectional shape which is the same as a cross-sectional shape of the crossarm.

12. The combination of claim 1, wherein the crossarm is an elongated tubular member.

13. In combination:
    an upright tubular metal pole;
    a generally horizontal aperture formed through the pole and extending though a central vertical axis of the pole;
    a tubular metal sleeve journaled through the aperture and fastened to the pole with opposite ends projecting outwardly from the pole;
    a tubular metal crossarm journaled though the sleeve, with free opposite ends projecting from the pole; and
    means connecting the crossarm to the sleeve to prevent movement of the crossarm relative to the sleeve and pole.

* * * * *